United States Patent [19]

Dupin

[11] 4,427,576

[45] Jan. 24, 1984

[54] CATALYST FOR OXIDATION OF HYDROGEN SULFIDE AND/OR ORGANOSULFUR COMPOUNDS TO $SO_2$ AND PROCESS FOR PREPARING THE CATALYST

[75] Inventor: Thierry Dupin, Garges, France

[73] Assignee: Rhone-Poulenc Specialites Chimques, Courbevoie, France

[21] Appl. No.: 353,243

[22] Filed: Mar. 1, 1982

[30] Foreign Application Priority Data

Mar. 13, 1981 [FR] France ................. 81 05030

[51] Int. Cl.$^3$ ............... B01J 21/06; B01J 21.08; B01J 23/02; B01J 27/02
[52] U.S. Cl. .................. 502/218; 423/224; 502/217
[58] Field of Search ............. 252/440, 475; 423/224

[56] References Cited

U.S. PATENT DOCUMENTS 1,900,751  3/1933  Baehr .................... 423/224

FOREIGN PATENT DOCUMENTS 1943759  4/1971  Fed. Rep. of Germany ...... 252/440
53-10368  1/1978  Japan ..................... 252/440

Primary Examiner—W. J. Shine
Attorney, Agent, or Firm—Burns, Doane, Swecker & Mathis

[57] ABSTRACT

The hydrogen sulfide, and/or organosulfur compounds, and/or elemental sulfur contained in gaseous effluents is/are catalytically oxidized to sulfur dioxide, employing an improved oxidation catalyst comprising (i) titanium dioxide, or admixture of titanium dioxide with zirconia or silica, (ii) an alkaline earth metal sulfate, and (iii) at least one of the elements copper, silver, zinc, cadmium, yttrium, lanthanides, vanadium, chromium, molybdenum, tungsten, manganese, iron, cobalt, rhodium, irridium, nickel, palladium, platinum, tin and bismuth.

37 Claims, No Drawings

CATALYST FOR OXIDATION OF HYDROGEN SULFIDE AND/OR ORGANOSULFUR COMPOUNDS TO SO₂ AND PROCESS FOR PREPARING THE CATALYST

CROSS-REFERENCE TO RELATED APPLICATION

My copending application, Ser. No. 353,219, filed concurrently herewith and assigned to the assignee hereof.

BACKGROUND OF THE INVENTION

1. Field of the Invention

The present invention relates to novel catalysts and to the utilization thereof in the oxidation of hydrogen sulfide and/or organosulfur compounds to sulfur dioxide.

2. Description of the Prior Art

Certain industrial effluents, and in particular the effluents originating from Claus reaction units, contain sulfur and/or polluting sulfur compounds which can be oxidized, and these gases must be treated such as to effect conversion of said sulfur/organosulfur compounds to sulfur dioxide by oxidation. The sulfur compounds which are present, in particular, in these effluents are principally hydrogen sulfide and organic sulfur compounds such as carbon disulfide and/or carbon oxysulfide and/or mercaptans.

It is known to this art to treat effluents containing hydrogen sulfide by burning them at high temperatures, but this method is now obsolete, both because of the high energy consumption entailed and, from a technical point of view, because of the considerable amount of oxygen which is required therefor.

Furthermore, catalytic processes for treating gases containing hydrogen sulfide too have already been proposed to this art; however, these processes have the disadvantages of being insufficiently catalytically active, of not effecting a complete oxidation of the hydrogen sulfide at a sufficiently low temperature, and of having an inadequate catalyst life.

Thus, it has to date been proposed, according to U.S. Pat. No. 1,900,751, to oxidize hydrogen sulfide to sulfur dioxide in the presence of a catalyst comprising active elements deposited on a support of silica gel or of calcined clay, the active phase elements being selected from among the following metals: nickel, iron, cobalt, manganese, zinc, copper and, if appropriate, chromium, vanadium, molybdenum, cerium, uranium, thorium, tungsten, silicon and carbon, and comprising up to 10% of compounds of lead, bismuth, alkali metals and alkaline earth metals, it being possible for these compounds to be oxides, hydroxides, carbonates and sulfates. It should be noted that, according to page 5, lines 94 and 96, of the said patent, the catalysts thus proposed are so unsatisfactory that it is necessary to increase the reaction temperature by 5% every 3 days.

A process for the oxidation of hydrogen sulfide to sulfur in the presence of a catalyst comprising the sulfates of the following metals: cadmium, cobalt, copper, iron, lead, nickel, tin, silver and zinc, deposited on a support of active alumina or of clay, is featured in British patent specification No. 769,996.

And a process for the oxidation of hydrogen sulfide to sulfur dioxide in the presence of a substantial proportion of hydrogen, such as to avoid the formation of SO₃, and in the presence of a catalyst comprising vanadium oxide deposited on a support of a non-alkaline, porous refractory oxide, has also been proposed; compare U.S. Pat. No. 4,092,404.

It has also been demonstrated that organic sulfur compounds are as polluting in nature and are as noxious as is hydrogen sulfide. Thus, serious need exists in this art for improved catalysts which enable removal of hydrogen sulfide and/or organic sulfur compounds in the form of sulfur dioxide.

SUMMARY OF THE INVENTION

Accordingly, a major object of the present invention is the provision of improved, very highly active catalysts for catalytically oxidizing, in gaseous phase, hydrogen sulfide and/or organosulfur compounds, and, if appropriate, sulfur, to sulfur dioxide. Furthermore, the topic catalysts are exceptionally long-lived.

Briefly, the catalysts according to the present invention comprise titanium dioxide or titanium dioxide/zirconia mixtures or titanium dioxide/silica mixtures, an alkaline earth metal sulfate and at least one element comprising the Groups Ib, IIb, IIIb, Vb, VIb, VIIb, VIII and Va of the Periodic Table of elements. The subject catalysts enable, in particular, the efficient oxidation, to sulfur dioxide, of oxidizable sulfur compounds such as hydrogen sulfide and/or carbon disulfide and/or carbon oxysulfide and/or mercaptans, and, if appropriate, sulfur itself.

DETAILED DESCRIPTION OF THE INVENTION

More particularly according to this invention, there is featured an improved catalyst for the oxidation to sulfur dioxide of hydrogen sulfide and/or organic sulfur compounds and, if appropriate, sulfur itself, said improved catalyst comprising titanium dioxide or titanium dioxide/zirconia mixtures or titanium dioxide/silica mixtures, an alkaline earth metal sulfate and at least one element selected from the group comprising copper, silver, zinc, cadmium, yttrium, lanthanides, vanadium, chromium, molybdenum, tungsten, manganese, iron, cobalt, rhodium, iridium, nickel, palladium, platinum, tin and bismuth.

The present invention also features a process for the simultaneous oxidation to sulfur dioxide of hydrogen sulfide and/or organic sulfur compounds and, if appropriate, sulfur itself, in gaseous phase, comprising charging a gas containing hydrogen sulfide and/or at least one organic sulfur compound and, if appropriate, elemental sulfur over a catalyst comprising titanium dioxide or titanium dioxide/zirconia mixtures or titanium dioxide/silica mixtures, an alkaline earth metal sulfate, and at least one element selected from the group comprising copper, silver, zinc, cadmium, yttrium, lanthanides, vanadium, chromium, molybdenum, tungsten, manganese, iron, cobalt, rhodium, iridium, nickel, palladium, platinum, tin and bismuth.

Preferably, the catalysts according to the invention contain titanium dioxide, an alkaline earth metal sulfate and at least one element selected from the Group A comprising: copper, silver, molybdenum, tungsten, iron and bismuth; and at least one element selected from Group B comprising: lanthanides, chromium, cobalt, rhodium, iridium, nickel, palladium, platinum, vanadium and tin.

The catalyst according to the invention comprises the sulfate of an alkaline earth metal selected from among calcium, barium, strontium and magnesium.

According to a preferred embodiment of the invention, the catalyst comprises calcium sulfate. The mechanical strength of this catalyst has been demonstrated to be exceptional.

The proportion by weight of titanium dioxide or titanium dioxide/zirconia or titanium dioxide/silica in the catalyst, relative to the total weight of the catalyst, preferably ranges from about 60 to 99% and more preferably ranges from 80 to 99%.

If titanium dioxide and zirconium oxide, or titanium dioxide and silica, are used, the proportion by weight of titanium oxide, relative to the titanium dioxide and zirconium oxide together, or the titanium dioxide and silica together, is greater than 30% and preferably greater than 50%.

The proportion by weight of alkaline earth metal sulfate, also relative to the total weight of the catalyst, preferably ranges from about 1 to 40% and more preferably ranges from 1 to 20%.

The atomic ratio of the catalytically active elements present in the catalyst to the elements present in the support, namely, the titanium, or the titanium and the zirconium, or the titanium and the silicon, ranges from about 0.00005 to 0.1.

Furthermore, according to another preferred embodiment of the invention, if the precious metals are not used, the atomic ratio of all of the elements of Group A to all of the element of Group B present in the catalyst preferably ranges from about 0.1 to 10 and more preferably ranges from 0.5 to 5.

If the precious metals of Group VIII are used as catalytically active elements of Group B, the atomic ratio defined above preferably ranges from about 20 to 1,000 and more preferably ranges from 50 to 400.

The catalyst according to the invention preferably has a specific surface area, measured by the B.E.T. method, ranging from about 20 m$^2$/g to 500 m$^2$/g and more preferably ranging from 40 m$^2$/g to 300 m$^2$/g.

The catalyst according to the invention can be prepared by any suitable process which makes it possible to obtain either a unit mass product containing titanium dioxide or titanium dioxide/zirconia mixtures or titanium dioxide/silica mixtures, the alkaline earth metal sulfate and the catalytically active elements, or a product consisting of titanium dioxide or titanium dioxide/zirconia mixtures or titanium dioxide/silica mixtures, impregnated on the surface thereof with the alkaline earth metal sulfate and the catalytically active elements.

According to a first method for preparation of the catalyst according to the invention, a shaped body of titanium dioxide or titanium dioxide/zirconia mixtures or titanium dioxide/silica mixtures is successively impregnated with a compound which provides the sulfate anion and then with a compound which provides the alkaline earth metal cation, such as to form the alkaline earth metal sulfate in situ within the shaped body based on titanium dioxide, and then, after drying and calcination, if appropriate, the product is next impregnated with the catalytically active elements, this being followed, if appropriate, by drying and then by calcination.

According to this first, preferred method of preparation, the shaped body based on titanium dioxide is obtained, in particular, according to the process described in U.S. Ser. No. 256,978, now U.S. Pat. No. 4,388,288. This process comprises the following steps:

(1) A mixture comprising:
   (i) from about 1 to about 40% by weight of water;
   (ii) from about 0 to about 15% by weight of shaping additive; and
   (iii) from about 45 to about 99% by weight of a poorly crystalline and/or amorphous titanium dioxide powder, having an ignition weight loss ranging from about 1 to 50%, is malaxated;

(2) this intimate admixture is next shaped;

(3) the resulting shaped article is dried and then calcined, if appropriate, at a temperature ranging from about 300° C. to about 900° C. and preferably from 350° to 800° C.;

(4) the shaped article is next impregnated with the alkaline earth metal sulfate, or a compound which provides the sulfate anion and a compound which provides the alkaline earth metal cation, and the product is dried and then calcined, if appropriate, at a temperature ranging from about 300° C. to about 900° C. and preferably from 350° to 800° C.; and (5) the resultant product is impregnated with the catalytically active elements or their precursors (compounds adopted to yield these elements or their oxides upon heating), and the product is dried, if appropriate, and then calcined at a temperature ranging from about 300° C. to about 900° C. and preferably from 350° to 800° C.

The compounds which in situ yield the sulfate anion are selected from among the group sulfuric acid and the sulfates which are soluble in aqueous solution, and in particular from among ammonium sulfate and hydroxylamine sulfate.

The compounds which in situ yield the alkaline earth metal cation are selected from among the group comprising the alkaline earth metal salts which are soluble in aqueous solution, and in particular from among the alkaline earth metal nitrates, chlorides and acetates.

The weight ratio of $SO_4$ to $TiO_2$ in the subject catalyst advantageously ranges from about 0.01 to 0.15 and preferably from 0.05 to 0.10.

The ratio by weight of the alkaline earth metal to the titanium oxide in the catalyst advantageously ranges from about 0.004 to 0.20 and preferably from 0.02 to 0.15.

According to a second method for preparation of the catalyst according to the invention, a mixture containing the titanium dioxide and either the alkaline earth metal sulfate, or a mixture of a compound which provides the sulfate anion and a compound which provides the alkaline earth metal cation, is shaped, and then, after drying and calcination, if appropriate, the product is impregnated with the catalytically active elements or their precursors, this being followed by drying and calcination.

The shaping can be carried out, in particular, by the process comprising the following steps, the essential features of which have been described above:

(1) A mixture comprising:
   (i) from about 1 to about 40% by weight of water;
   (ii) from about 0 to about 15% by weight of shaping additive; and
   (iii) from 45 to 99% by weight of a powder consisting of poorly crystalline and/or amorphous titanium dioxide and either the alkaline earth metal sulfate or a mixture of the compound which provides sulfate and the compound which provides the alkaline earth metal cation, is malaxated;

(2) the resulting intimate mixture is next shaped and the products obtained are dried and then calcined, if appropriate, at a temperature ranging from about 300° C. to about 900° C. and preferably from 350° C. to 800° C.; and (3) the resultant products are impregnated with the catalytically active elements or their precursors, and the products obtained are dried, if appropriate, and then calcined at a temperature ranging from about 300° C. to about 900° C. and preferably from 350° C. to 800° C.

The compounds which provide the sulfate anion or the alkaline earth metal cation, and their proportions, are those which have been described above in the first method for preparation of the catalyst according to the invention.

According to a third method for preparation of the catalyst according to the invention, the starting material employed is the titanium dioxide orginating from the attack of ilmenite with sulfuric acid, after hydrolysis, filtration and drying, and containing sulfate anions, for example, in the form of sulfuric acid, titanyl sulfate, titanium sulfate and/or basic salts, for example, those of the general formula:

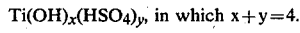

Ti(OH)$_x$(HSO$_4$)$_y$, in which x+y=4.

According to a first variant of this third method for preparation of the catalyst of the invention, the procedure involves the following steps:

(a) A mixture comprising:
  (i) from about 1 to about 40% by weight of water;
  (ii) from about 0 to about 15% by weight of shaping additive; and
  (iii) from 45 to 99% by weight of a powder consisting of a compound which provides the alkaline earth metal cation, and of titanium dioxide originating from the attack of ilmenite with sulfuric acid and containing sulfate anions, the weight ratio of SO$_4$ to TiO$_2$ in the powder ranging from about 0.01 to about 0.15 and preferably from 0.05 to 0.10, the weight ratio of the alkaline earth metal to the titanium dioxide in the powder ranging from about 0.004 to 0.20 and preferably from 0.02 to 0.15, and the loss on ignition of this powder ranging from about 1 and about 50%, is malaxated;

(b) the resulting mixture is next shaped;

(c) the resultant products are dried and then calcined, if appropriate, at a temperature ranging from about 300° C. to about 900° C. and preferably from 350° to 800° C.; and (d) the resulting product is impregnated with the catalytically active elements or their precursors, and the final products are then dried, if appropriate, and then calcined at a temperature ranging from about 300° C. to about 800° C.

According to a second variant of this third method for preparation of the catalyst according to the invention, the procedure involves the following steps:

(A) A mixture comprising:
  (i) from about 1 to about 40% by weight of water;
  (ii) from about 0 to about 15% by weight of shaping additive; and
  (iii) from 45 to 99% by weight of a titanium dioxide powder originating from the attack of ilmenite with sulfuric acid and containing sulfate anions, the weight ratio of SO$_4$ to TiO$_2$ in the powder ranging from about 0.01 to 0.15 and preferably from 0.05 to 0.10, and the LOI of this powder preferably ranging from about 1 to about 50%, is malaxated;

(B) the mixture is shaped and the product is then dried and calcined, if appropriate, at a temperature ranging from about 300° C. to about 900° C. and preferably from 350 and 800° C.;

(C) the shaped product is next impregnated with a compound which is soluble in aqueous solution and which provides the alkaline earth metal cation;

(D) the products obtained are dried and then calcined, if appropriate, at a temperature ranging from about 300° to about 900° C. and preferably from 350° to 800° C., and the resulting product is then impregnated with the catalytically active elements or their precursors; and (E) the resultant products are dried, if appropriate, and then calcined at a temperature ranging from about 300° to about 900° C. and preferably from 350° to 800° C.

According to a fourth method for preparation of the catalyst according to the invention, a shaped body based on titanium dioxide and containing the alkaline earth metal cation is sulfated. This sulfation can be carried out at a temperature ranging from 250° to 550° C. by a gas preferably containing a mixture of sulfur dioxide and air, the weight ratios (SO$_4$/TiO$_2$) and (alkaline earth metal/TiO$_2$) being those set forth above.

The products prepared in this manner are subsequently dried, if appropriate, then calcined at a temperature ranging from 300° to 900° C. and preferably from 350° to 800° C., then impregnated with the catalytically active elements or their precursors, then dried, if appropriate, and then calcined at a temperature ranging from 300° to 900° C. and preferably from 350° and 800° C.

In this method for preparation of the catalyst according to the invention, the catalytically active elements are introduced in the form of their salts which are soluble in aqueous solution.

The process for the oxidation to sulfur dioxide of hydrogen sulfide and/or organic sulfur compounds and, if appropriate, elemental sulfur, in gaseous phase, in the presence of the catalyst of the invention, can be carried out by bringing a gas containing molecular oxygen into contact with the effluent containing the aforesaid pollutants. This gas is typically air and, if appropriate, oxygen-enriched air or pure oxygen. The amount of oxygen contained in this gas is at least equal to, and preferably greater than, the stoichiometric amount necessary for the oxidation of all of said pollutants to sulfur dioxide. Advantageously, the amount of oxygen present in the gas represents an excess of about 15 to 100%, relative to stoichiometry.

The process of the invention is carried out at temperatures above about 150° C. and preferably at temperatures ranging from about 200° to 550° C.

The composition of the gases which can be treated according to the process of the invention can vary over very wide limits. In general, the industrial effluents which can be treated according to the invention preferably contain on the order of 0.5 to 5% by volume of sulfur compounds.

The amounts of catalysts employed are preferably such that the VVH ranges from 1,000 to 30,000 and advantageously ranges from 1,500 to 10,000 (VVH representing the volume of gas treated per volume of catalyst and per hour).

In order to further illustrate the present invention and the advantages thereof, the following specific examples are given, it being understood that same are intended only as illustrative and in nowise limitative.

EXAMPLE 1

A suspension obtained after hydrolysis of titanium tetrachloride was washed by decantation and filtered, and the solids were then dried in an oven at 110° C. for 24 hours. The resulting powder had an amorphous structure as determined by X-rays, and its LOI was 18%.

A mixture consisting of this powder, to which water and carboxymethylcellulose had been added in the following proportions:
(i) 66% of this powder;
(ii) 32% of water; and
(iii) 2% of carboxymethylcellulose; was malaxated for 30 minutes.

This mixture of malaxation was then extruded through a 3 mm die and the extrudates were dried at 110° C. for 8 hours and then calcined at 450° C. for 2 hours. The characteristics of the extruded products thus obtained were as follows:

$SBE = 135 \ m^2g^{-1}$ $TPV = 0.32 \ cm^3g^{-1}$

One kilogram of product was first impregnated with 310 cm$^3$ of a solution of ammonium sulfate, such as to provide a weight ratio (SO$_4$/TiO$_2$)=0.06, and was dried at 100° C. for 4 hours.

The dried products were then impregnated with 300 cm$^3$ of a solution of calcium nitrate, such as to provide a weight ratio (Ca/TiO$_2$)=0.025.

The product was dried at 110° C. for 12 hours.

This support was impregnated with 300 cm$^3$ of a solution of ferric nitrate, dried at 110° C. for 2 hours and then calcined at 450° C. for 2 hours. The final product had the following characteristics:

$SBE = 107 \ m^2g^{-1}$ $TPV = 0.29 \ cm^3g^{-1}$ $(Fe/Ti) = 0.06$

EXAMPLE 2

The support obtained according to the procedure of Example 1 was impregnated with a solution of ferric nitrate and lanthanum nitrate. The catalyst was dried at 110° C. overnight and then calcined at 400° C. for 1 hour, and had the following characteristics:
Atomic ratio: (Fe+La)/Ti=0.09 (La/Fe)=2
Specific surface area: SBE= 102 m$^2$g$^{-1}$

EXAMPLE 3

The catalyst of Example 1 was impregnated a second time with a solution of palladium chloride. The product was dried at 110° C. for 8 hours and then calcined at 350° C. for 1 hour. The catalyst possessed the following characteristics:
Specific surface area: SBE= 106 m$^2$g$^{-1}$
Atomic ratio: (Fe+Pd)/Ti=0.0603 (Fe/Pd)=200

EXAMPLE 4

The catalyst of Example 1 was impregnated a second time with a solution of chloroplatinic acid, dried at 110° C. for 24 hours and then calcined at 400° C. for 1 hour. The catalyst possessed the following characteristics:
Specific surface area: SBE= 103 m$^2$g$^{-1}$
Atomic ratio: (Fe+Pt)/Ti=0.0606 (Fe/Pt)=100

EXAMPLE 5

Calcium nitrate was incorporated into a suspension of titanium oxide obtained, after hydrolysis and filtration, by the conventional process for the attack, or acidulation of ilmenite with sulfuric acid, and containing sulfate anions in an amount such that the weight ratio (SO$_4$/TiO$_2$)=0.08, the calcium nitrate being incorporated such as to cause all of the sulfates to react, the weight ratio (Ca/TiO$_2$) then being 0.033.

The suspension was dried at 150° C. for 1 hour.

The powder obtained was malaxated for 2 hours in the presence of water in the following proportions:
(i) 64% of this powder; and
(ii) 26% of water.

The mixture was then extruded through a 4 mm die and the extrudates were dried at 110° C. for 4 hours and then calcined at 400° C. for 2 hours.

The characteristics of the support thus obtained were as follows:
SBE: 146 m$^2$g$^{-1}$
TPV: 0.35 cm$^3$g$^{-1}$ This support was impregnated with a solution of silver nitrate. The product was dried at 110° C. overnight and then calcined at 450° C. for 2 hours. The catalyst had the following characteristics:
Specific surface area: SBE= 117 m$^2$g$^{-1}$
Atomic ratio: (Ag/Ti)=0.04

EXAMPLE 6

The support obtained according to the procedure of Example 5 was impregnated with a solution of silver nitrate and cerous nitrate; it was subsequently dried at 150° C. for 4 hours and then calcined at 400° C. for 2 hours. The product catalyst had the following characteristics:
Specific surface area: SBE= 126 m$^2$g$^{-1}$
Atomic ratio: (Ag+Ce)/Ti=0.08 (Ag/Ce=1

EXAMPLE 7

The cerous nitrate was replaced with cobalt nitrate and the previous example was repeated. The catalyst then had the following characteristics:
Specific surface area: SBE= 102 m$^2$g$^{-1}$
Atomic ratio: (Ag+Co/Ti)=0.07 (Ag/Co)=1.5

EXAMPLE 8

The support obtained according to the procedure of Example 5 was impregnated with a solution of metatungstic acid, dried at 150° C. for 4 hours, then impregnated with a solution of neodymium/praseodymium acetate, dried at 150° C. for 4 hours and then calcined at 450° C. for 2 hours. The catalyst had the following characteristics:
Specific surface area: SBE=98 m$^2$g$^{-1}$
Atomic ratio: (W+Nd+Pr)/Ti=0.10 W/(Nd+Pr)=4

EXAMPLE 9

The support obtained according to the procedure of Example 5 was impregnated with a solution of metatungstic acid and nickel nitrate, dried at 150° C. for 4 hours and then calcined at 450° C. for 2 hours. The catalyst had the following characteristics:
Specific surface area: SBE=89 $m^2g^{-1}$
Atomic ratio: (W+Ni/Ti)=0.12 (W/Ni)=2

EXAMPLE 10

The powder obtained in Example 5 was malaxated for one hour in the presence of water and of microporous silica having an SBE of 517 $m^2g^{-1}$, in the following proportions:
(i) 36% of this powder;
(ii) 35% of silica; and
(iii) 29% of water.

The mixture was then extruded through a 4 mm die and the extrudates were dried at 110° C. for 2 hours and then calcined at 400° C. for 2 hours. The support thus obtained had the following characteristics:

SBE=312 $m^2g^{-1}$

TPV=0.57 $cm^3g^{-1}$

This support was impregnated with a solution of ferrous sulfate, slightly acidified with sulfuric acid. It was dried at 150° C. for 2 hours and calcined at 450° C. for two hours. The product catalyst had the following characteristics:
Specific surface area: SBE=295 $m^2g^{-1}$
Atomic ratio: Fe/(Si+Ti)=0.05

EXAMPLE 11

The support of Example 10 was impregnated with a solution of ammoniacal cuprous chloride, dried at 110° C. for 8 hours and calcined at 450° C. for 2 hours. The product catalyst had the following characteristics:
Specific surface area: SBE=280 $m^2g^{-1}$
Atomic ratio: Cu/(Si+Ti)=0.04

EXAMPLE 12

The catalyst obtained in Example 11 was impregnated with a solution of ammonium metavanadate, dried at 150° C. for 4 hours and calcined at 400° C. for 2 hours. The product catalyst had the following characteristics:
Specific surface area: SBE=285 $m^2g^{-1}$
Atomic ratio: (Cu+V)/(Si+Ti)=0.06 (Cu/V)=2

EXAMPLE 13

The catalyst of Example 11 was impregnated with a solution of iridium chloride, dried at 110° C. for 24 hours and then calcined at 400° C. for 2 hours. The product catalyst had the following characteristics:
Specific surface area: SBE=267 $m^2g^{-1}$
Atomic ratio: (Cu+Ir)/(Si+Ti)=0.06015 (Cu/Ir)=400

EXAMPLE 14

The silica/titanium oxide support used in Example 10 was impregnated with a solution of ammonium paramolybdate, dried at 110° C. overnight and then calcined at 450° C. for two hours. The product catalyst had the following characteristics:
Specific surface area: SBE=370 $m^2g^{-1}$
Atomic ratio: Mo/(Si+Ti)=0.06

EXAMPLE 15

The catalyst of the previous example was impregnated again with a solution of chromic acid, dried at 150° C. for 4 hours and then calcined at 400° C. for 2 hours. The product catalyst had the following characteristics:
Specific surface area: SBE=364 $m^2g^{-1}$
Atomic ratio: (Mo+Cr)/(Si+Ti)=0.08 (Mo/Cr)=2

EXAMPLE 16

The silica/titanium dioxide support used in Example 10 was impregnated with a solution of bismuth nitrate in nitric acid, dried at 110° C. for 24 hours and then calcined at 450° C. for 2 hours. The product catalyst had the following characteristics:
Specific surface area: SBE=373 $m^2g^{-1}$
Atomic ratio: Bi/(Si+Ti)=0.04

EXAMPLE 17

The catalyst of Example 10 was impregnated with a solution of rhodium chloride, dried at 110° C. for 24 hours and then calcined at 400° C. for 2 hours. The product catalyst had the following characteristics:
Specific surface area: SBE=371 $m^2g^{-1}$
Atomic ratio: (Bi+Rh)/(Si+Ti)=0.0401 (Bi/Rh)=400

COMPARATIVE EXAMPLE 18

By way of comparison, a catalyst was prepared which was similar to that described in Example 1 above, but in which the support consisted of silica. The characteristics of this catalyst were as follows:
SBE=210 $m^2g^{-1}$
TPV=0.29 $cm^3g^{-1}$
Atomic ratio: (Fe/Si)=0.06
Weight ratio: (Ca/$SiO_2$)=0.025
Weight ratio: ($SO_4$/$SiO_2$)=0.06.

COMPARATIVE EXAMPLE 19

By way of comparison, a catalyst was prepared which was similar to that described in Example 1 above, but in which the support consisted of a clay of montmorillonite type, displaying a ratio $SiO_2$/$Al_2O_3$ of 3. The characteristics of this catalyst were as follows:
SBE=60 $m^2g^{-1}$
TPV=0.31 $cm^3g^{-1}$
Atomic ratio: Fe/(Si+Al)=0.06
Weight ratio: Ca/($SiO_2$+$Al_2O_3$)=0.025
Weight ratio: $SO_4$/($SiO_2$+$Al_2O_3$)=0.06

COMPARATIVE EXAMPLE 20

By way of comparison, a catalyst was prepared in which the support consisted of silica onto which the following had been successively deposited: calcium nitrate, Ca($NO_3$)$_2$, such as to provide a weight ratio (Ca/$SiO_2$)=0.025 and then a solution of ferric nitrate, such as to provide a catalyst having the following characteristics:

SBE=210 $m^2g^{-1}$

TPV=0.29 $cm^3g^{-1}$

Atomic ratio: (Fe/Si)=0.06

In contrast to the catalysts of Example 1 of the invention, this catalyst did not comprise calcium sulfate, but, after calcination, comprised calcium oxide.

COMPARATIVE EXAMPLE 21

By way of comparison, a catalyst was prepared which was similar to that described in Example 20, but in which the calcium nitrate was replaced by calcium carbonate, CaCO₃, the latter having been introduced during the manufacture of the silica support, such as to provide a weight ratio (Ca/SiO$_2$)=0.025

Weight ratio: (CO$_3$/SiO$_2$)=0.06.

The product was then impregnated with ferric nitrate such as to provide a catalyst having the following characteristics:

SBE=210 m$^2$g$^{-1}$

TPV=0.29 cm$^3$g$^{-1}$

Atomic ratio: (Fe/Si)=0.06.

In contrast to the catalysts of Example 1 of the invention, this catalyst did not comprise calcium sulfate, but, after calcination, comprised calcium oxide.

EXAMPLE 22

The present example illustrates the utilization of the catalysts obtained according to the above examples in the oxidation, in gas phase, of hydrogen sulfide and organic sulfur compounds.

A gas having the following composition by volume:
H$_2$S: 800 ppm
COS: 100 ppm
CS$_2$: 500 ppm
SO$_2$: 400 ppm
O$_2$: 2%
H$_2$O: 30%
N$_2$: 67.82% was charged through a reactor containing the catalyst.

The VVH was 1,800 and the temperature at which the gases entered the reactor was 380° C.

The results obtained with each of the above catalysts are recorded in the following table:

TABLE I

| Catalyst of Example No. | Conversion of H$_2$S in % | Conversion of CS$_2$ in % | Conversion of COS in % |
|---|---|---|---|
| 1 | >99% | 65 | 54 |
| 2 | >99% | 81 | 56 |
| 3 | >99% | 98 | 94 |
| 4 | >99% | 98 | 93 |
| 5 | >99% | 61 | 57 |
| 6 | >99% | 73 | 69 |
| 7 | >99% | 71 | 68 |
| 8 | >99% | 77 | 75 |
| 9 | >99% | 89 | 83 |
| 10 | >99% | 77 | 84 |
| 11 | >99% | 85 | 67 |
| 12 | >99% | 75 | 52 |
| 13 | >99% | 91 | 72 |
| 14 | >99% | 73 | 66 |
| 15 | >99% | 79 | 67 |
| 16 | >99% | 61 | 56 |
| 17 | >99% | 94 | 89 |
| 18 [comparative] | 95% | 25 | 14 |
| 19 [comparative] | 35% | 10 | 6 |
| 20 [comparative] | 30% | 9 | 7 |
| 21 [comparative] | | | |

It is thus apparent that the catalysts of the invention are, surprisingly, considerably superior to the catalysts described in the prior art and, in particular, in U.S. Pat. No. 1,900,751.

EXAMPLE 23

The present example illustrates the utilization of the catalysts of the invention, obtained according to Examples 1 to 17 above, in the oxidation of a gas containing organic sulfur compounds.

A gas having the following composition by volume:
CS$_2$: 1,200 ppm
COS: 500 ppm
O$_2$: 2%
H$_2$O: 22%
N$_2$: 74.95% was charged through a reactor containing the catalyst.

The VVH was 1,800 and the temperature at which the gases entered the reactor was 350° C.

The results obtained with each of the catalysts are recorded in the following table:

TABLE II

| Catalyst of Example No. | Conversion of CS$_2$ in % | Conversion of COS in % |
|---|---|---|
| 1 | 77 | 65 |
| 2 | 88 | 67 |
| 3 | >99 | 98 |
| 4 | >99 | 98 |
| 5 | 78 | 75 |
| 6 | 83 | 80 |
| 7 | 80 | 82 |
| 8 | 89 | 89 |
| 9 | 93 | 91 |
| 10 | 84 | 91 |
| 11 | 91 | 86 |
| 12 | 83 | 77 |
| 13 | 96 | 83 |
| 14 | 83 | 75 |
| 15 | 86 | 75 |
| 16 | 77 | 68 |
| 17 | 98 | 93 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A long-lived catalyst composition, consisting essentially of (i) titanium dioxide, or admixture of titanium dioxide with zirconia or silica, (ii) an alkaline earth metal sulfate, and (iii) at least one of the elements copper, silver, zinc, cadmium, yttrium, lanthanides, vanadium, chromium, molybdenum, tungsten, manganese, iron, cobalt, rhodium, iridium, nickel, palladium, platinum, tin and bismuth, the amount by weight of the component (i) therein, relative to the total weight thereof, ranging from about 60 to about 99%.

2. A long-lived catalyst composition comprising (i) titanium dioxide, (ii) an alkaline earth metal surfate, (iiiA) at least one of the elements copper, silver, milybdenum, tungsten, iron and bismuth, and (iiiB) at least one of the elements lanthanides, chromium, cobalt, rhodium, iridium, nickel, palladium, platinum, vanadium and tin.

3. The catalyst composition as defined by claim 1 the component (ii) comprising the sulfate of calcium, barium, strontium or magnesium.

4. The catalyst composition as defined by claim 2, the component (ii) comprising the sulfate of calcium, barium, strontium or magnesium.

5. The catalyst composition as defined by claims 3 or 4 the component (ii) comprising calcium sulfate.

6. The catalyst composition as defined by claim 4, the amount of weight of the component (i) therein, relative to the total weight thereof, ranging from about 60 to about 99%.

7. The catalyst composition as defined by claims 3 or 6, the amount by weight of the component (i) therein, relative to the total weight thereof, ranging from about 80 to about 99%.

8. The catalyst composition as defined by claims 3 or 6 the component (i) comprising admixture of titanium dioxide with zirconia or silica, and the amount by weight of the titanium dioxide therein, relative to the total weight of said admixture, being greater than 30%.

9. The catalyst composition as defined by claim 8, the component (i) comprising admixture of titanium dioxide with zirconia or silica, and the amount of weight of the titanium dioxide therein, relative to the total weight of said admixture, being greater than 50%.

10. The catalyst composition as defined by claims 3 or 6 the amount by weight of the component (ii) therein, relative to the total weight thereof, ranging from about 1 to about 40%.

11. The catalyst composition as defined by claim 7, the amount by weight of the component (ii) therein, relative to the total weight thereof, ranging from about 1 to about 20%.

12. The catalyst composition as defined by claim 10, the atomic ratio of the catalytically active elements (iii) therein, relative to the component (i) thereof, ranging from about 0.00005 to about 0.1.

13. The catalyst composition as defined by claim 2, the component (iiiB) comprising other than a precious metal, and the atomic ratio of the catalytically active elements (iiiA) relative to the catalytically active elements (iiiB) therein, ranging from about 0.1 to about 10.

14. The catalyst composition as defined by claim 13, the component (iiiB) comprising other than a precious metal, and the atomic ratio of the catalytically active elements (iiiA) relative to the catalytically active elements (iiiB) therein, ranging from about 0.5 to about 5.

15. The catalyst composition as defined by claim 2, the component (iiiB) comprising a Group VIII precious metal, and the atomic ratio of the catalytically active elements (iiiA) relative to said catalytically active elements (iiiB) therein, ranging from about 20 to about 10,000.

16. The catalyst composition as defined by claim 15, the component (iiiB) comprising a Group VIII precious metal, and the atomic ratio of the catalytically active elements (iiiA) relative to said catalytically active elements (iiiB) therein, ranging from about 50 to about 400.

17. The catalyst composition as defined by claim 12, having a BET specific surface area ranging from about 20 $m^2/g$ to about 500 $m^2/g$.

18. The catalyst composition as defined by claim 17, having a BET specific surface area ranging from about 40 $m^2/g$ to about 300 $m^2/g$.

19. The catalyst composition as defined by claims 3 or 6, the same having been shaped and activated by calcination.

20. The catalyst composition as defined by claim 12, the same having been shaped and activated by calcination.

21. The catalyst composition as defined by claim 19, the same comprising a unit mass of the components (i), (ii) and (iii).

22. The catalyst composition as defined by claim 19, the same comprising a mass of the component (i) surface impregnated with the components (ii) and (iii).

23. A long-lived catalyst composition, comprising (i) titanium dioxide, or admixture of titanium dioxide with zirconia or silica, (ii) an alkaline earth metal surfate, and (iii) at least one of the elements copper, silver, zinc, cadmium, yttrium, lanthanides, vanadium, chromium, molybdenum, tungsten, manganese, iron, cobalt, rhodium, iridium, nickel, palladium, platinum, tin and bismuth, the catalyst composition having a BET specific surface area ranging from about 20 $m^2/g$ to about 500 $m^2/g$.

24. A process for the preparation of the catalyst composition as defined by claims 3 or 6, comprising impregnating a shaped catalyst substrate comprising the component (i) with both a donor compound for the sulfate anion and with a donor compound for the alkaline earth metal, and same comprising the component (ii), optionally drying and optionally calcining said impregnated shaped catalyst substrate, next successively impregnating same with said component (iii) elements, and thence optionally drying and calcining the resultant shaped catalyst substrate, each of the calcining steps being at a temperature ranging from about 300° to about 900° C.

25. A process for the preparation of the catalyst composition as defined by claims 3 or 4 which comprises (1) malaxating an intimate admixture comprising (a) from about 1 to about 40% by weight of water, (b) from about 0 to about 15% by weight of a shaping additive, and (c) from about 45 to about 99% by weight of a powder having an ignition weight loss ranging from about 1 to about 50% and including poorly crystalline and/or amorphous titanium dioxide, (2) shaping the mixture of malaxation into catalyst form, (3) optionally drying and optionally calcining said resultant catalyst shaped article at a temperature ranging from about 300° to about 900° C., (4) next impregnating said catalyst shaped article with either calcium, barium, strontium or magnesium sulfate, or admixture of donor compounds together providing both sulfate anion and calcium, barium, strontium or magnesium cation, (5) optionally drying and optionally calcining said impregnated catalyst shaped article at a temperature ranging from about 300° C. to about 900° C., (6) next impregnating said catalyst shaped article with the catalytically active elements (iii) or precursors thereof, and (7) thence optionally drying and then calcining the resulting shaped catalyst at a temperature ranging from about 300° to about 900° C.

26. The process as defined by claim 25, the ratio by weight of $SO_4$ to $TiO_2$ therein ranging from about 0.01 to about 0.15, and the ratio by weight of the alkaline earth metal to the $TiO_2$ therein ranging from about 0.004 to about 0.20.

27. The process as defined by claim 26, the ratio by weight of $SO_4$ to $TiO_2$ therein ranging from about 0.05 to about 0.10, and the ratio by weight of the alkaline earth metal to the $TiO_2$ therein ranging from about 0.02 to about 0.15.

28. The process as defined by claim 26, said step (4) comprising impregnating said catalyst shaped article with admixture of donor compounds together providing both sulfate anion and calcium, barium, strontium or magnesium cation.

29. The process as defined by claim 28, said donor compound for the sulfate anion being sulfuric acid or a sulfate which is soluble in aqueous solution, and said donor compound for the alkaline earth metal cation being a salt which is soluble in aqueous solution.

30. The process as defined by claim 29, said donor compound for the sulfate anion being ammonium sulfate or hydroxylamine sulfate, and said donor compound for the alkaline earth metal cation being a nitrate, chloride or acetate of calcium, barium, strontium or magnesium.

31. A process for the preparation of the catalyst composition as defined by claims 3 or 4 which comprises (1) malaxating an intimate admixture comprising (a) from about 1 to about 40% by weight of water, (b) from about 0 to about 15% by weight of a shaping additive, and (c) from about 45 to about 99% by weight of a powder including poorly crystalline and/or amorphous titanium dioxide, and either calcium, barium, strontium or magnesium sulfate, or admixture of donor compounds together providing both sulfate anion and calcium, barium, strontium or magnesium cation, (2) shaping the mixture of malaxation into catalyst form, (3) optionally drying and optionally calcining said resulting catalyst shaped article at a temperature ranging from about 300° to about 900° C., (4) next impregnating said catalyst shaped article with the catalytically active elements (iii) or precursors thereof, and (5) thence optionally drying and then calcining the resultant shaped catalyst at a temperature ranging from about 300° to about 900° C.

32. A process for the preparation of the catalyst composition as defined by claims 3 or 4 which comprises (1) malaxating an intimate admixture comprising (a) from about 1 to about 40% by weight of water, (b) from about 0 to about 15% by weight of a shaping additive, and (c) from about 45 to about 99% by weight of a powder including a donor compound for the calcium, barium, strontium or magnesium cation, and sulfate anion containing titanium dioxide resulting from the sulfuric acid acidulation of ilmenite, with the ratio by weight of $SO_4$ to $TiO_2$ in said powder ranging from about 0.01 to about 0.15, the ratio by weight of the alkaline earth metal to the titanium dioxide therein ranging from about 0.004 to about 0.20, and the ignition weight loss of such powder ranging from about 1 to about 50%, (2) shaping the mixture of malaxation into catalyst form, (3) optionally calcining said resulting catalyst shaped article at a temperature ranging from about 300° to 900° C., (4) next impregnating said catalyst shaped article with the catalytically active elements (iii) or precursors thereof, and (5) thence optionally drying and then calcining the resultant shaped catalyst at a temperature ranging from about 300° to about 900° C.

33. The process as defined by claim 32, the ratio by weight of $SO_4$ to $TiO_2$ in said powder ranging from about 0.05 to about 0.10, and the ratio by weight of the alkaline earth metal to the $TiO_2$ therein ranging from about 0.02 to about 0.15.

34. A process for the preparation of the catalyst composition as defined by claims 3 or 4 which comprises (1) malaxating an intimate admixture comprising (a) from about 1 to about 40% by weight of water, (b) from about 0 to about 15% by weight of a shaping additive, and (c) from about 45 to about 99% by weight of a sulfate anion containing titanium dioxide powder resulting from the sulfuric acid acidulation of ilmenite, with the ratio by weight of $SO_4$ to $TiO_2$ in said powder ranging from about 0.1 to about 0.15 and the ignition weight loss of such powder ranging from about 1 to about 50%, (2) shaping the mixture of malaxation into catalyst form, (3) optionally drying and optionally calcining said resulting catalyst shaped article at a temperature ranging from about 300° to about 900° C., (4) next impregnating said catalyst shaped article with a calcium, barium, strontium or magnesium cation donor compound which is soluble in aqueous solution, (5) optionally drying and optionally calcining said resulting catalyst shaped article at a temperature ranging from about 300° to about 900° C., (6) next impregnating said catalyst shaped article with the catalytically active elements (iii) or precursors thereof, and (7) thence optionally drying and then calcining the resultant shaped article at a temperature ranging from about 300° to about 900° C.

35. The process as defined by claim 34 the ratio by weight of $SO_4$ to $TiO_2$ on said powder ranging from about 0.05 to about 0.10.

36. A process for the preparation of the catalyst composition as defined by claims 3 or 4 which comprises (1) sulfating a titanium dioxide shaped catalyst substrate, said $TiO_2$ shaped substrate comprising calcium, barium, strontium or magnesium cations, (2) optionally drying and calcining said resulting shaped catalyst substrate at a temperature ranging from about 300° to about 900° C., (3) next impregnating said shaped catalyst substrate with the catalytically active elements (iii) or precursors thereof, and (4) thence optionally drying and then calcining the resultant shaped catalyst substrate at a temperature ranging from about 300° C. to 900° C.

37. The process as defined by claim 36, said sulfation being carried out with a mixture of sulfur dioxide and air, at a temperature ranging from about 250° C. to about 550° C.

* * * * *